United States Patent
Zhuang et al.

(10) Patent No.: US 11,687,747 B2
(45) Date of Patent: Jun. 27, 2023

(54) ELECTRONIC SHELF LABEL WAKE-UP METHOD AND SYSTEM AND RELATED ASSEMBLY

(71) Applicant: SHENZHEN MINEW TECHNOLOGIES CO LTD, Shenzhen (CN)

(72) Inventors: Yan Zhuang, Shenzhen (CN); Renjie Xiao, Shenzhen (CN)

(73) Assignee: SHENZHEN MINEW TECHNOLOGIES CO LTD, Shenzhen (CN)

(*) Notice: Subject to any disclaimer, the term of this patent is extended or adjusted under 35 U.S.C. 154(b) by 97 days.

(21) Appl. No.: 17/608,872

(22) PCT Filed: Apr. 8, 2020

(86) PCT No.: PCT/CN2020/083655
§ 371 (c)(1),
(2) Date: Nov. 4, 2021

(87) PCT Pub. No.: WO2020/238422
PCT Pub. Date: Dec. 3, 2020

(65) Prior Publication Data
US 2022/0327299 A1    Oct. 13, 2022

(30) Foreign Application Priority Data
May 30, 2019 (CN) .......................... 201910464576.6

(51) Int. Cl.
*G06K 7/10* (2006.01)
(52) U.S. Cl.
CPC .............................. *G06K 7/10366* (2013.01)
(58) Field of Classification Search
CPC .................................................. G06K 7/10366
(Continued)

(56) References Cited

U.S. PATENT DOCUMENTS

| 5,933,813 A * | 8/1999 | Teicher .............. G06Q 30/0283 705/28 |
| 2009/0085738 A1* | 4/2009 | Darianian .......... G06K 17/0022 340/572.1 |

(Continued)

FOREIGN PATENT DOCUMENTS

| CN | 102664644 A | 9/2012 |
| CN | 102708339 A | 10/2012 |

(Continued)

OTHER PUBLICATIONS

International Searching Authority, International Search Report and Written Opinion for International Application No. PCT/CN2020/083655, dated Jul. 11, 2020, (9 pages), China National Intellectual Property Administration, Beijing, China.

*Primary Examiner* — Jamara A Franklin
(74) *Attorney, Agent, or Firm* — Alston & Bird LLP

(57) ABSTRACT

An electronic shelf label wake-up method comprising: receiving an electronic shelf label wake-up instruction sent by a server; determining-target feature information of all electronic shelf labels to be woken up, and constructing a wake-up data packet according to all of the target feature information; and sending the wake-up data packet to all the electronic shelf labels so as to wake up the electronic shelf labels corresponding to the target feature information. In the present application, a plurality of electronic shelf labels can be woken up at the same time, and the efficiency of waking up electronic shelf labels in batches is improved. Further disclosed are an electronic shelf label wake-up system, a wake-up data packet processing method, a wake-up data packet processing system, a computer-readable storage medium, a main-end device and an electronic shelf label, which have the above beneficial effects.

15 Claims, 3 Drawing Sheets

(58) Field of Classification Search
USPC ............ 235/375, 385, 451; 340/572.1–572.9
See application file for complete search history.

(56) References Cited

U.S. PATENT DOCUMENTS

| | | |
|---|---|---|
| 2010/0115302 A1 | 5/2010 | Cho et al. |
| 2014/0177604 A1 | 6/2014 | Lee et al. |
| 2014/0214620 A1 | 7/2014 | Hulth et al. |
| 2015/0179129 A1 | 6/2015 | Byun |

FOREIGN PATENT DOCUMENTS

| | | |
|---|---|---|
| CN | 103534717 A | 1/2014 |
| CN | 104732403 A | 6/2015 |
| CN | 105868807 A | 8/2016 |
| CN | 106550313 A | 3/2017 |
| CN | 107105020 A | 8/2017 |
| CN | 20747364 U | 6/2018 |
| CN | 110097157 A | 8/2019 |
| JP | 5630677 B2 | 11/2014 |

* cited by examiner

ELECTRONIC SHELF LABEL WAKE-UP METHOD AND SYSTEM AND RELATED ASSEMBLY

CROSS REFERENCE TO RELATED APPLICATIONS

This application is a national stage application, filed under 35 U.S.C. § 371, of International Patent Application No. PCT/CN2020/083655, filed Apr. 8, 2020, which international application claims priority to and the benefit of Chinese Patent Application No. 201910464576.6, filed May 30, 2019; the contents of both of which as are hereby incorporated by reference in their entireties.

BACKGROUND

Technical Field

The present application relates to the technical field of the internet of things (IOT), and in particular to an electronic shelf label wake-up method, an electronic shelf label wake-up system, a wake-up data packet processing method, a wake-up data packet processing system, a computer-readable storage medium, a master terminal device and an electronic shelf label.

Description of Related Art

An electronic shelf label (ESL) is a new generation of multi-stable electronic display device placed on a shelf and capable of replacing a traditional paper price label and a TN-type liquid crystal display. The electronic shelf label incorporates the shelf into a computer program, which gets rid of situations of manually changing the price labels, thereby realizing price consistency between the cashier and the shelf.

An electronic shelf label system based on a Bluetooth technology may include a server, a gateway device, a master terminal device and electronic shelf labels. the main terminal device and the electronic shelf labels can communicate through wireless Bluetooth. In most of the time, the electronic shelf labels are in a dormant state, run with low power consumption, and periodically scan a wake-up signal, for example, scan for 10 milliseconds every 5 seconds. In the electronic shelf label system, the number of electronic shelf labels is often relatively large, and the system often needs to quickly wake up some or all of the electronic shelf labels in order to complete a data update operation.

In related technologies, the electronic shelf label wake-up method includes sending by the master terminal device the wake-up signal to each of the electronic shelf labels one by one to wake up the electronic shelf labels one by one. That is to say, if the terminal requires to wake up N electronic shelf labels, the master terminal device needs to send at least N wake-up signals. In the related technologies, the wake-up operations of the electronic shelf labels are performed serially, and an overall time of the wake-up operations of the electronic shelf labels is relatively long.

Therefore, technical problems for those skilled in the art to be solved at present are how to simultaneously wake up multiple electronic shelf labels and how to improve efficiency of waking up the electronic shelf labels in batches.

BRIEF SUMMARY

A purpose of the present application is to provide an electronic shelf label wake-up method, an electronic shelf label wake-up system, a wake-up data packet processing method, a wake-up data packet processing system, a computer-readable storage medium, a master terminal device and an electronic shelf label, which can realize wake-up of multiple electronic shelf labels at the same time and improve efficiency of waking up the electronic shelf labels in batches.

In order to solve the above technical problems, the present application provides an electronic shelf label wake-up method, the electronic shelf label wake-up method is applied to a master terminal device and includes:

receiving an electronic shelf label wake-up instruction sent by a server;

determining, according to the electronic shelf label wake-up instruction, target feature information of all electronic shelf labels to be woken up, and constructing a wake-up data packet according to all of the target feature information;

sending the wake-up data packet to all the electronic shelf labels so as to wake up electronic shelf labels corresponding to the target feature information.

Optionally, the determining, according to the electronic shelf label wake-up instruction, target feature information of all electronic shelf labels to be woken up and constructing a wake-up data packet according to all of the target feature information includes:

determining tag IDs of all the electronic shelf labels to be woken up according to the electronic shelf label wake-up instruction;

constructing the wake-up data packet according to all the tag IDs, here a preset field range of the wake-up data packet comprises the tag IDs of all the electronic shelf labels to be woken up.

Optionally, the determining, according to the electronic shelf label wake-up instruction, target feature information of all electronic shelf labels to be woken up and constructing a wake-up data packet according to all of the target feature information includes:

determining preset field values of tag IDs of all the electronic shelf labels to be woken up according to the electronic shelf label wake-up instruction;

calculating a mask corresponding to each of the preset field values, and constructing the wake-up data packet including all the masks.

The present application further provides an electronic shelf label wake-up system, the electronic shelf label wake-up system is applied to a master terminal device and includes:

an instruction receiving module configured to receive an electronic shelf label wake-up instruction sent by a server;

a data packet construction module configured to determine, according to the electronic shelf label wake-up instruction, target feature information of all electronic shelf labels to be woken up and construct a wake-up data packet according to all the target feature information;

a wake-up module configured to send the wake-up data packet to all the electronic shelf labels, so as to wake up electronic shelf labels corresponding to the target feature information.

The present application further provides a wake-up data packet processing method, the wake-up data packet processing method is applied to an electronic shelf label and includes:

parsing the wake-up data packet to obtain target feature information when a wake-up data packet sent by a master terminal device is received;

determining whether the target feature information comprises tag feature information of the electronic shelf label;

setting a working state as a wake-up state if the target feature information comprises the tag feature information of the electronic shelf label.

Optionally, the determining whether the target feature information includes tag feature information of the electronic shelf label includes:

determining whether all the tag IDs comprise a tag ID of the electronic shelf label when the target feature information comprises a tag ID;

calculating a preset field value corresponding to each mask when the target feature information comprises a mask, and determining whether all the preset field values comprise a target ID field value of the electronic shelf label.

The present application further provides a wake-up data packet processing system, the wake-up data packet processing system is applied to an electronic shelf label and includes:

a parsing module configured to parse a wake-up data packet to obtain target feature information when a wake-up data packet sent by a master terminal device is received;

a determination module configured to determine whether the target feature information comprises tag feature information of the electronic shelf label;

a state setting module configured to set a working state as a wake-up state when the target feature information comprises the tag feature information of the electronic shelf label.

The present application further provides a computer-readable storage medium, a computer program is stored on the computer-readable storage medium, and the computer program, when executed by a processor, implements steps of the electronic shelf label wake-up method or the wake-up data packet processing method.

The present application further provides a master terminal device including a memory and a processor, the memory is configured to store a computer program, the processor, when invoking the computer program in the memory, is configured to implement steps of the electronic shelf label wake-up method.

The present application further provides an electronic shelf label including a memory and a processor, the memory is configured to store a computer program, the processor, when invoking the computer program in the memory, is configured to implement steps of the wake-up data packet processing method.

The present application provides an electronic shelf label wake-up method, the electronic shelf label wake-up method is applied to the master terminal device and includes: receiving the electronic shelf label wake-up instruction sent by the server; determining, according to the electronic shelf label wake-up instruction, the target feature information of all the electronic shelf labels to be woken up, and constructing the wake-up data packet according to all of the target feature information; and sending the wake-up data packet to all the electronic shelf labels so as to wake up the electronic shelf labels corresponding to the target feature information.

In the present application, the master terminal device first determines the target feature information of the electronic shelf labels required to be woken up after receiving the electronic shelf label wake-up instruction, and constructs the wake-up data packet according to the target feature information. After receiving the wake-up data packet, the electronic shelf label determines whether the target feature information includes its own feature information, and the working state of the electronic shelf label is set as the wake-up state if the target feature information includes its own feature information. In the above solutions provided in the present application, the wake-up data packet sent by the master terminal device includes the feature information of each of the electronic shelf labels required to be woken up, after the wake-up data packet is sent to all the electronic shelf labels, the electronic shelf label (the feature information of which is consistent with the target feature information) may be woken up, thereby realizing the effect that the master terminal device can wake up multiple electronic shelf labels at the same time by sending the wake-up data packet only once. Since the above process does not need to send multiple times in series, the efficiency of waking up the electronic shelf labels can be improved. In other words, the present application can realize waking up multiple electronic shelf labels at the same time and improve the efficiency of waking up the electronic shelf labels in batches. The present application also provides the electronic shelf label wake-up system, the wake-up data packet processing method, the wake-up data packet processing system, the computer-readable storage medium, the master terminal device and the electronic shelf label, which are all provided with the above beneficial effects that are not repeated herein again.

BRIEF DESCRIPTION OF THE FIGURES

In order to explain embodiments of the present application more comprehensively, drawings needed to be used in the embodiments will be briefly introduced below. Obviously, the drawings in the following description are only some embodiments of the present application, and other drawings may be obtained based on these drawings for those skilled in the art without paying any creative work.

DETAILED DESCRIPTION OF VARIOUS EMBODIMENTS

In order to make the purpose, technical solutions and advantages of the embodiments of the present application more comprehensible, the technical solutions in the embodiments of the present application will be described clearly and completely in conjunction with the drawings in the embodiments of the present application. Obviously, the described embodiments are some embodiments, but not all the embodiments, of the present application. Based on the embodiments in the present application, all other embodiments obtained by those of ordinary skill in the art without paying any creative work shall fall within the protection scope of the present application.

Figure 1:
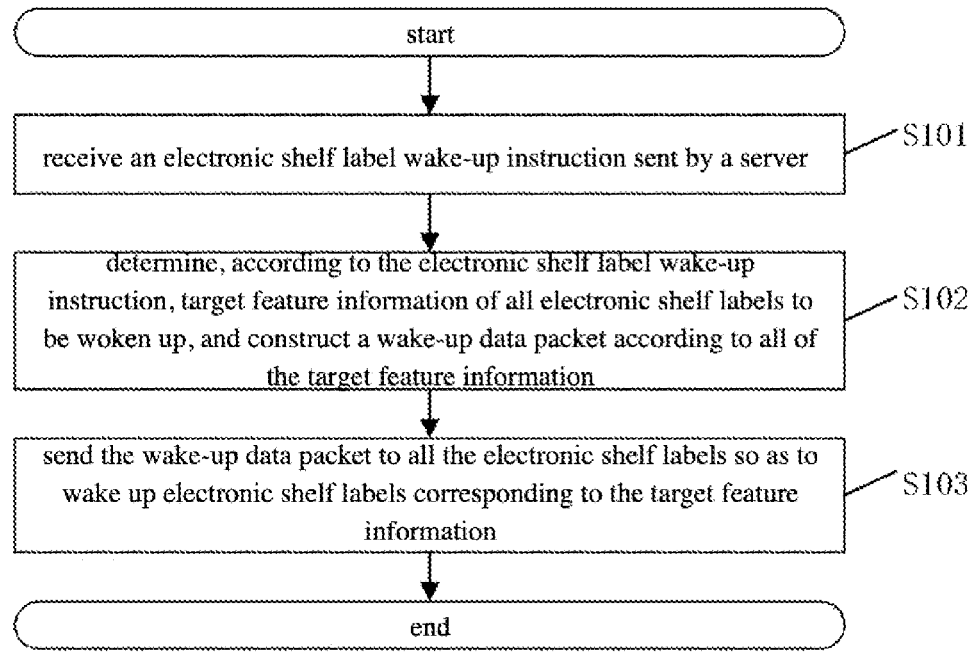
FIG. 1 is a flowchart of an electronic shelf label wake-up method provided by an embodiment of the present application.

Please refer to FIG. 1 below. FIG. 1 is a flowchart of an electronic shelf label wake-up method provided by an embodiment of the present application.

Specific steps of the method may include following.

At S101, receive an electronic shelf label wake-up instruction sent by a server.

This embodiment may be applied to a master terminal device of an electronic shelf label system, and the master terminal device may be a device provided with a wireless communication module to perform information interaction with electronic shelf labels based on the wireless communication module. The wireless communication module may be a Bluetooth module, a Wi-Fi module, or the like. The electronic shelf label system may include a server, the master terminal device connected to the server through a gateway device, and the electronic shelf labels. This embodiment does not limit the number of the server, the gateway device, the master terminal device, and the electronic shelf labels.

Before this step, there may be an operation of generating, by the server, an electronic shelf label wake-up instruction, and transmitting the electronic shelf label wake-up instruction to the master terminal device through the gateway device. Due to a huge number of the electronic shelf labels in the electronic shelf label system, in practical applications, only a part of the electronic shelf labels, but not all of the electronic shelf labels, need to be woken up, therefore, the electronic shelf label wake-up instruction may include feature information of electronic shelf labels required to be woken up during a wake-up process in this time, so as to realize wake-up of any number of labels.

At S102, determine, according to the electronic shelf label wake-up instruction, target feature information of all electronic shelf labels to be woken up, and construct a wake-up data packet according to all of the target feature information.

After the electronic shelf label wake-up instruction is obtained, there may be an operation of parsing the electronic shelf label wake-up instruction to obtain target feature information of the electronic shelf labels to be woken up. The electronic shelf labels to be woken up are electronic shelf labels that need to be woken up during this wake-up operation. As a feasible implementation, the target feature information may include ID information and factory serial numbers etc. of the electronic shelf labels. The ID information of the electronic shelf labels may specifically be MAC addresses of the electronic shelf labels. As another feasible implementation, the target feature information may be a specific field value of the ID information or the factory serial number. In other words, the target feature information mentioned in this step may be the feature information of one electronic shelf label or one type of electronic shelf labels. For example, when the target feature information is the ID information of the electronic shelf label, then the electronic shelf label provided with the specific ID information needs to be woken up; when the target feature information is first two field values of the factory serial number of the electronic shelf labels and the first two field values of the factory serial number is 10, then all the electronic shelf labels provided with the first two field values of 10 in their serial number need to be woken up.

It should be understood that this embodiment does not limit the number of the electronic shelf labels to be woken up, so there may be multiple pieces of target feature information determined in this step. In this step, a wake-up data packet is constructed according to all the target feature information, that is, the wake-up data packet may include all the target feature information.

At S103, send the wake-up data packet to all the electronic shelf labels so as to wake up electronic shelf labels corresponding to the target feature information.

A working state of the electronic shelf label may include a dormant state and a wake-up state. When the electronic shelf label is in the dormant state, the electronic shelf label may only display a related image or related text without connecting with the master terminal device. When the electronic shelf label is in the wake-up state, the electronic shelf label may establish a connection with the master terminal device and realize data interaction with the master terminal device.

The wake-up data packet mentioned in this embodiment is a data packet that needs to be sent to all the electronic shelf labels. After receiving the wake-up data packet, the electronic shelf label is capable of determining whether it meets a condition of being woken up according to the target feature information in the wake-up data packet. If the electronic shelf label meets the condition, the working state of the electronic shelf label will be set as the wake-up state, if the electronic shelf label does not meet the condition, the electronic shelf label will continue to keep its original working state (such as the dormant state).

As a feasible implementation, after waking up the electronic shelf label, there may be operations of establishing a connection between the master terminal device and the electronic shelf label, and performing data interaction between the master terminal device and the electronic shelf label.

In this embodiment, the master terminal device first determines the target feature information of the electronic shelf labels required to be woken up after receiving the electronic shelf label wake-up instruction, and constructs the wake-up data packet according to the target feature information. After receiving the wake-up data packet, the electronic shelf label determines whether the target feature information includes its own feature information, and the working state of the electronic shelf label is set as the wake-up state if the target feature information includes its own feature information. In the above solution provided in this embodiment, the wake-up data packet sent by the master terminal device includes the feature information of each of the electronic shelf labels required to be woken up, after the wake-up data packet is sent to all the electronic shelf labels, the electronic shelf label (the feature information of which is consistent with the target feature information) may be woken up, thereby realizing the effect that the master terminal device can wake up multiple electronic shelf labels at the same time by sending the wake-up data packet only once. Since the above process does not need to send multiple times in series, the efficiency of waking up the electronic shelf labels can be improved. In other words, this embodiment can realize waking up multiple electronic shelf labels at the same time and improve the efficiency of waking up the electronic shelf labels in batches.

As a further supplement to the embodiment corresponding to FIG. 1, the operation of constructing the wake-up data packet at S102 may include following steps of:

at step 1, determining tag IDs of all the electronic shelf labels to be woken up according to the electronic shelf label wake-up instruction;

at step 2, constructing the wake-up data packet according to all the tag IDs, here a preset field range of the wake-up data packet includes the tag IDs of all the electronic shelf labels to be woken up.

Regarding the above supplement, one wake-up data packet includes identification numbers (namely the tag ID) of one or more electronic shelf labels. After each of the electronic shelf labels receives the wake-up data packet, the electronic shelf label checks whether the wake-up data packet includes its own identification number, and the electronic shelf label is woken up if the wake-up data packet includes its own identification number.

As a further supplement to the embodiment corresponding to FIG. 1, a mask and part data of the identification numbers of the electronic shelf labels may also be used to realize the wake-up in batches, and the operation of constructing the wake-up data packet at S102 may include following steps of:

at step 1, determining preset field values of the tag IDs of all the electronic shelf labels to be woken up according to the electronic shelf label wake-up instruction;

at step 2, calculating the mask corresponding to each of the preset field values, and constructing the wake-up data packet including all the masks.

Figure 2:
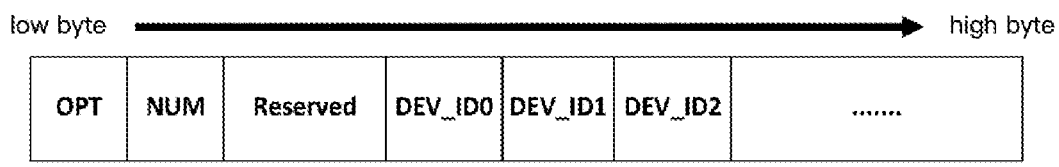
FIG. 2 is a structural schematic diagram of a wake-up data packet.

Specifically, a structure of the wake-up data packet mentioned in the above supplement may refer to FIG. 2, which is a structural schematic diagram of the wake-up data packet. The data packet structure of the wake-up data packet in FIG. 2 is described as follows.

A first field (OPT) of the wake-up data packet occupies 1 byte. When OPT is 0, it indicates that the device ID is directly used for wake-up; when OPT is a value from 1 to 8, it indicates that the mask is used for wake-up. A second field (NUM) occupies 1 byte. When the device ID is used for wake-up, it indicates that the OPT is followed by the number of DEV_ID., and the total packet length is generally set as 100 bytes, which may include up to 14 device IDs. A third field (Reserved) occupies 10 bytes and is temporarily reserved unused, it may be used to verify correctness of the data packet. DEV_ID0, DEV_ID1, DEV_ID2, etc. of a fourth field and subsequent fields of the fourth field are values of the device IDs, occupying 6 bytes, the specific content of which may include device MAC addresses or other specific values, thereby making sure that each device ID is unique.

When the target feature information is the preset field value of the tag ID, this is equivalent to using the mask wake-up method to realize the wake-up of the electronic shelf label, which may include following operations of:

at step a, calculating the mask by using the field value of OPT, here the mask is equal to 2N-1 by assuming the OPT value is N, for example, if the OPT is equal to 3, then the mask is $2^3-1=7$;

at step b, performing an AND operation of the mask obtained in the step 1 and a designated field of the device ID of the electronic shelf label, such as the lowest byte;

at step c, performing an AND operation of the mask obtained in the step a and a designated field of the device ID0 in the wake-up data packet, such as the lowest byte;

if a result obtained in the step b is equal to a result obtained in the step c, the wake-up condition is satisfied.

Through the above-mentioned mask wake-up method, it is possible to realize sending one wake-up data packet by the master terminal device to wake up a large number of electronic shelf labels at the same time. For example, if the OPT value is equal to 1, at least half of the electronic shelf labels can be woken up in batches at one time.

Figure 3:
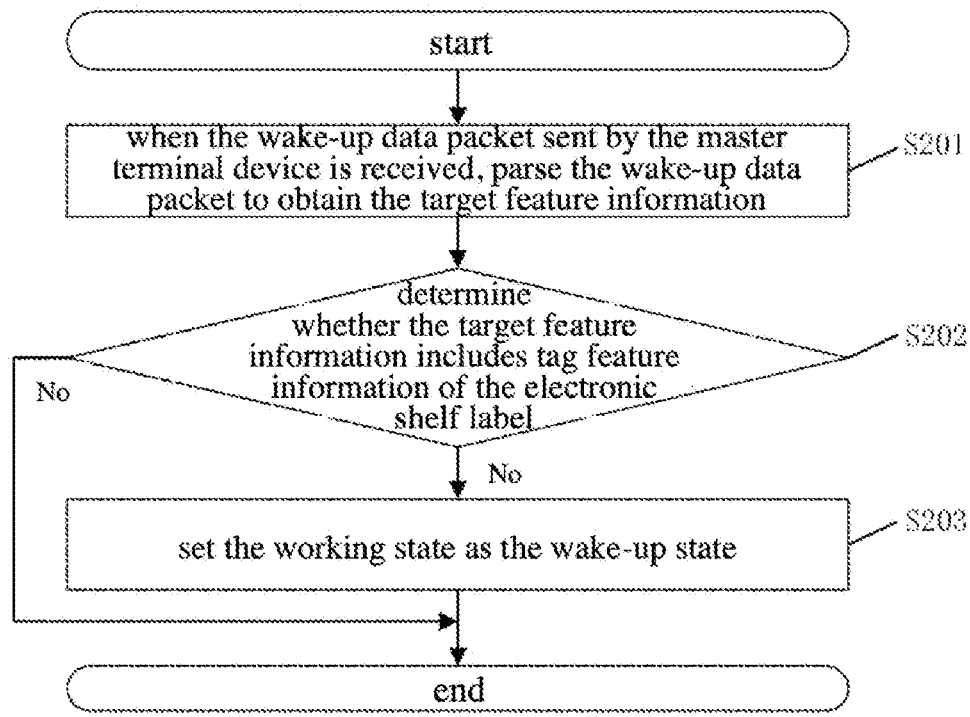
FIG. 3 is a flowchart of a wake-up data packet processing method provided by an embodiment of the present application.

Please refer to FIG. 3 below. FIG. 3 is a flowchart of a wake-up data packet processing method provided by an embodiment of the present application.

At S201, when the wake-up data packet sent by the master terminal device is received, parse the wake-up data packet to obtain the target feature information.

At S202, determine whether the target feature information includes the tag feature information of the electronic shelf label; if so, go to S203.

At S203, set the working state as the wake-up state.

The above embodiments are related operations performed by the electronic shelf label after receiving the wake-up data packet. This embodiment may be applied to the electronic shelf label in the dormant state, and the electronic shelf label in the dormant state may scan the wake-up data packet sent by the master terminal device according to a preset period. After the wake-up data packet is detected, the wake-up data packet may be parsed to obtain the target feature information, and the target feature information may include the tag ID or the mask.

If the target feature information is the tag ID, the electronic shelf label may determine whether all the tag IDs include its own tag ID. If it is included, it means that this electronic shelf label is an electronic shelf label to be woken up; if it is not included, it means that this electronic shelf label is not an electronic shelf label to be woken up and may continue to keep in the dormant state.

If the target feature information is the mask, the electronic shelf label may calculate a preset field value corresponding to each mask, and determine whether all the preset field values include a target ID field value of this electronic shelf label. If it is included, it means that this electronic shelf label is an electronic shelf label to be woken up; if it is not included, it means that this electronic shelf label is not an electronic shelf label to be woken up and may continue to keep in the dormant state. For example, the lowest byte of the MAC address designated by the target ID field value is 1 according to the mask, then the working state is set as the wake-up state when the lowest byte of the MAC address of this electronic shelf label is 1, and the working state is kept as the dormant state when the lowest byte of the MAC address of this electronic shelf label is not 1.

Through using the wake-up data packet processing method described in the above embodiment, after multiple electronic shelf labels receive the wake-up data packet, the multiple electronic shelf labels can determine whether they are required to be woken up according to the wake-up data packet, thereby the master terminal device can wake up the multiple electronic shelf labels in batches by send one wake-up data packets, there is no need to send the wake-up packets multiple times in series.

Figure 4:
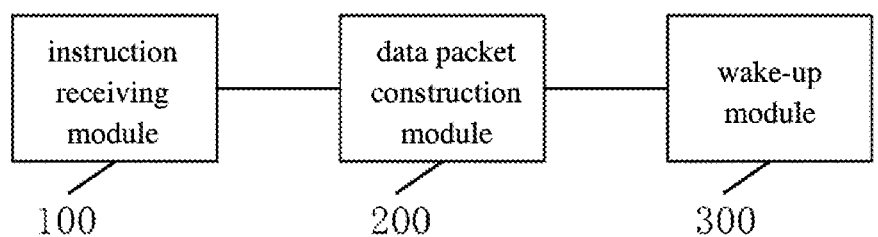
FIG. 4 is a structural schematic diagram of an electronic shelf label wake-up system provided by an embodiment of the present application.

Please refer to FIG. 4, FIG. 4 is a structural schematic diagram of an electronic shelf label wake-up system provided by an embodiment of the present application.

This system may include:

an instruction receiving module 100 configured to receive an electronic shelf label wake-up instruction sent by a server;

a data packet construction module 200 configured to determine target feature information of all electronic shelf labels to be woken up according to the electronic shelf label wake-up instruction and construct a wake-up data packet according to all the target feature information;

a wake-up module 300 configured to send the wake-up data packet to all the electronic shelf labels, so as to wake up the electronic shelf labels corresponding to the target feature information.

In this embodiment, the master terminal device first determines the target feature information of the electronic shelf labels to be woken up after receiving the electronic shelf label wake-up instruction, and constructs the wake-up data packet according to the target feature information. The electronic shelf label determines whether the target feature information includes its own feature information after receiving the wake-up data packet, the working state of the electronic shelf label is set as the wake-up state if the target feature information includes its own feature information. In the above solution provided in this embodiment, the wake-up data packet sent by the master terminal device includes the feature information of each of the electronic shelf labels required to be woken up, and the electronic shelf label provided with this target feature information may be woken up after the wake-up data packet is sent to all the electronic shelf labels, thereby realizing the effect that the master terminal device can wake up multiple electronic shelf labels at the same time by sending the wake-up data packet once. Since the above process does not need to send multiple times in series, the efficiency of waking up the electronic shelf labels can be improved. In other words, this embodiment can realize waking up multiple electronic shelf labels at the same time, and improve the efficiency of waking up the electronic shelf labels in batches.

Further, the data packet construction module 200 includes:

an ID determination unit configured to determine tag IDs of all the electronic shelf labels to be woken up according to the electronic shelf label wake-up instruction;

a first construction unit configured to construct the wake-up data packet according to all the tag IDs; here a preset field range of the wake-up data packet includes the tag IDs of all the electronic shelf labels to be woken up.

Further, the data packet construction module 200 includes:

an ID field determination unit configured to determine preset field values of the tag IDs of all the electronic shelf labels to be woken up according to the electronic shelf label wake-up instruction;

a second construction unit configured to calculate a mask corresponding to each of the preset field values and construct the wake-up data packet including all the masks.

Figure 5:
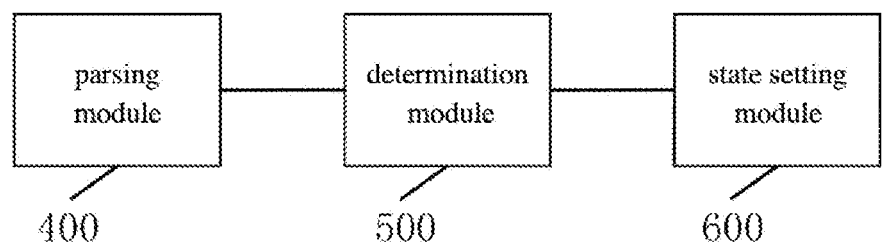
FIG. 5 is a structural schematic diagram of a wake-up data packet processing system provided by an embodiment of the present application.

Please refer to FIG. 5, FIG. 5 is a structural schematic diagram of a wake-up data packet processing system provided by an embodiment of the present application.

This system may include:

a parsing module 400 configured to parse the wake-up data packet to obtain target feature information when a wake-up data packet sent by the master terminal device is received;

a determination module 500 configured to determine whether the target feature information includes tag feature information of the electronic shelf label;

a state setting module 600 configured to set a working state as a wake-up state when the target feature information includes the tag feature information of the electronic shelf label.

Further, the determination module 500 includes:

a first determination sub-unit configured to determine whether all the tag IDs include the tag ID of the electronic shelf label when the target feature information includes tag IDs;

a second determination sub-unit configured to calculate a preset field value corresponding to each mask when the target feature information is a mask, and determine whether all the preset field values include a target ID field value of the electronic shelf label.

Through using the wake-up data packet processing method described in the above embodiment, after multiple electronic shelf labels receive the wake-up data packet, the multiple electronic shelf labels can determine whether they are required to be woken up according to the wake-up data packet, and the master terminal device can wake up the multiple electronic shelf labels in batches by sending the wake-up data packet once, therefore there is no need to send wake-up packets multiple times in series.

Since the embodiments of the system and the embodiments of the method correspond to each other, the embodiments of the system may refer to the description of the embodiments of the method, which will not be repeated herein.

The present application also provides a computer-readable storage medium on which a computer program is stored, and the computer program, when executed, may implement the steps provided in the above-mentioned embodiments. The storage medium may include any kind of medium that is capable of storing a program code, such as a U disk, a mobile hard disk, a ROM (read-only memory), a RAM (random access memory), a magnetic disk, or an optical disk etc.

The present application also provides a master terminal device, which may include a memory and a processor, the memory is stored with a computer program therein, and when the processor invokes the computer program in the memory, the steps provided by the above-mentioned electronic shelf label wake-up method may be implemented. Of course, the master terminal device may further include components such as various network interfaces, power supplies and the like.

The present application also provides an electronic shelf label including a memory and a processor, the memory is stored with a computer program therein, and when the processor invokes the computer program in the memory, the steps provided by the above-mentioned wake-up data packet processing method may be implemented. Of course, the electronic shelf label may further include components such as various network interfaces, power supplies and the like.

The embodiments in the specification are described in a progressive manner, and the technical feature emphasized in each embodiment are different from that emphasized in other embodiments, and the same or similar parts of the various embodiments may refer to each other. For the system disclosed in the embodiments, since the system corresponds to the method disclosed in the embodiments, the description for the system is relatively simple, and the relevant parts of the system may refer to the description of the parts of the method. It should be pointed out that for those of ordinary skill in the art, several improvements and modifications may be made to the present application without departing from the principle of the present application, and these improvements and modifications also fall within the protection scope of the claims of the present application.

It should also be noted that in this specification, relational terms such as "first" and "second" are only used to distinguish one entity or operation from another entity or operation, and do not necessarily require or imply that there is any such actual relationship or sequence between these entities or operations. Moreover, the terms "comprise", "include" or any other variations thereof are intended to cover non-exclusive inclusion, so that a process, method, article or device including a series of elements not only includes those elements, but also includes other elements that are not explicitly listed, or also includes elements inherent to this process, method, article or device. Under a condition without more restrictions, the element defined by the sentence "including a . . . " does not exclude that the process, method, article, or equipment including this element includes other identical elements.

What is claimed is:

1. An electronic shelf label wake-up method, comprising:
   receiving an electronic shelf label wake-up instruction sent by a server;
   determining, according to the electronic shelf label wake-up instruction, target feature information of all electronic shelf labels to be woken up, and constructing a wake-up data packet according to all of the target feature information;

sending the wake-up data packet to all the electronic shelf labels so as to wake up electronic shelf labels corresponding to the target feature information.

2. The electronic shelf label wake-up method of claim 1, wherein, the determining, according to the electronic shelf label wake-up instruction, target feature information of all electronic shelf labels to be woken up and constructing a wake-up data packet according to all of the target feature information comprises:

determining tag IDs of all the electronic shelf labels to be woken up according to the electronic shelf label wake-up instruction;

constructing the wake-up data packet according to all the tag IDs, wherein a preset field range of the wake-up data packet comprises the tag IDs of all the electronic shelf labels to be woken up.

3. The electronic shelf label wake-up method of claim 1, wherein, the determining, according to the electronic shelf label wake-up instruction, target feature information of all electronic shelf labels to be woken up and constructing a wake-up data packet according to all of the target feature information comprises:

determining preset field values of tag IDs of all the electronic shelf labels to be woken up according to the electronic shelf label wake-up instruction;

calculating a mask corresponding to each of the preset field values and constructing the wake-up data packet including all the masks.

4. The electronic shelf label wake-up method of claim 1, wherein, after the sending the wake-up data packet to all the electronic shelf labels, the electronic shelf label wake-up method further comprises:

parsing the wake-up data packet to obtain the target feature information when the wake-up data packet sent by a master terminal device is received;

determining whether the target feature information comprises tag feature information of the electronic shelf label; and setting a working state as a wake-up state if the target feature information comprises the tag feature information of the electronic shelf label.

5. The electronic shelf label wake-up method of claim 4, wherein the determining whether the target feature information comprises tag feature information of the electronic shelf label comprises:

determining whether all tag IDs comprise a tag ID of the electronic shelf label when the target feature information comprises a tag ID;

calculating a preset field value corresponding to each mask when the target feature information comprises a mask, and determining whether all the preset field values comprise a target ID field value of the electronic shelf label.

6. An electronic shelf label wake-up system, comprising:
an instruction receiving module configured to receive an electronic shelf label wake-up instruction sent by a server;
a data packet construction module configured to determine, according to the electronic shelf label wake-up instruction, target feature information of all electronic shelf labels to be woken up and construct a wake-up data packet according to all the target feature information; and a wake-up module configured to send the wake-up data packet to all the electronic shelf labels, so as to wake up electronic shelf labels corresponding to the target feature information.

7. The electronic shelf label wake-up system of claim 6, wherein the data packet construction module comprises:
an ID determination unit configured to determine tag IDs of all the electronic shelf labels to be woken up according to the electronic shelf label wake-up instruction; and
a first construction unit configured to construct the wake-up data packet according to all the tag IDs;
wherein a preset field range of the wake-up data packet comprises the tag IDs of all the electronic shelf labels to be woken up.

8. The electronic shelf label wake-up system of claim 6, wherein the data packet construction module comprises:
an ID field determination unit configured to determine preset field values of tag IDs of all the electronic shelf labels to be woken up according to the electronic shelf label wake-up instruction; and
a second construction unit configured to calculate a mask corresponding to each of the preset field values and construct the wake-up data packet including all the masks.

9. The electronic shelf label wake-up system of claim 6, wherein the electronic shelf label wake-up system further comprises:
a parsing module configured to parse the wake-up data packet to obtain the target feature information when the wake-up data packet sent by a master terminal device is received;
a determination module configured to determine whether the target feature information comprises tag feature information of the electronic shelf label; and
a state setting module configured to set a working state as a wake-up state when the target feature information comprises the tag feature information of the electronic shelf label.

10. The electronic shelf label wake-up system of claim 9, wherein the determination module comprises:
a first determination sub-unit configured to determine whether all the tag IDs include a tag ID of the electronic shelf label when the target feature information comprises tag IDs; and
a second determination sub-unit configured to: calculate a preset field value corresponding to each mask when the target feature information comprises masks and determine whether all the preset field values comprise a target ID field value of the electronic shelf label.

11. A computer-readable storage medium, wherein, a computer program is stored on the computer-readable storage medium, and the computer program, when executed by a processor, implements steps of:
receiving an electronic shelf label wake-up instruction sent by a server;
determining, according to the electronic shelf label wake-up instruction, target feature information of all electronic shelf labels to be woken up, and constructing a wake-up data packet according to all of the target feature information;
sending the wake-up data packet to all the electronic shelf labels so as to wake up electronic shelf labels corresponding to the target feature information.

12. The computer-readable storage medium of claim 11, wherein the determining, according to the electronic shelf label wake-up instruction, target feature information of all electronic shelf labels to be woken up and constructing a wake-up data packet according to all of the target feature information comprises:

determining tag IDs of all the electronic shelf labels to be woken up according to the electronic shelf label wake-up instruction; and constructing the wake-up data packet according to all the tag IDs, wherein a preset field range of the wake-up data packet comprises the tag IDs of all the electronic shelf labels to be woken up.

13. The computer-readable storage medium of claim 11, wherein the determining, according to the electronic shelf label wake-up instruction, target feature information of all electronic shelf labels to be woken up and constructing a wake-up data packet according to all of the target feature information comprises:

determining preset field values of tag IDs of all the electronic shelf labels to be woken up according to the electronic shelf label wake-up instruction; and calculating a mask corresponding to each of the preset field values and constructing the wake-up data packet including all the masks.

14. The computer-readable storage medium of claim 11, wherein, after the step of sending the wake-up data packet to all the electronic shelf labels, the computer program, when executed by a processor, further implements steps of:

parsing the wake-up data packet to obtain the target feature information when the wake-up data packet sent by a master terminal device is received;

determining whether the target feature information comprises tag feature information of the electronic shelf label; and setting a working state as a wake-up state if the target feature information comprises the tag feature information of the electronic shelf label.

15. The computer-readable storage medium of claim 14, wherein the determining whether the target feature information comprises tag feature information of the electronic shelf label comprises:

determining whether all tag IDs comprise a tag ID of the electronic shelf label when the target feature information comprises a tag ID;

calculating a preset field value corresponding to each mask when the target feature information comprises a mask, and determining whether all the preset field values comprise a target ID field value of the electronic shelf label.

\* \* \* \* \*